United States Patent
Lim

(10) Patent No.: US 7,738,893 B2
(45) Date of Patent: Jun. 15, 2010

(54) TALK BURST ALLOCATION IN A PTT COMMUNICATION NETWORK

(75) Inventor: Guk-Chan Lim, Gyeonggi-Do (KR)

(73) Assignee: LG Electronics Inc., Seoul (KR)

(*) Notice: Subject to any disclaimer, the term of this patent is extended or adjusted under 35 U.S.C. 154(b) by 855 days.

(21) Appl. No.: 11/192,250

(22) Filed: Jul. 27, 2005

(65) Prior Publication Data
US 2006/0030344 A1   Feb. 9, 2006

Related U.S. Application Data

(60) Provisional application No. 60/591,602, filed on Jul. 28, 2004.

(30) Foreign Application Priority Data

Dec. 29, 2004   (KR) ............ 10-2004-0115566

(51) Int. Cl.
- H04B 7/00 (2006.01)
- H04B 7/212 (2006.01)
- H04M 3/00 (2006.01)
- H04W 4/00 (2009.01)
- H04L 12/66 (2006.01)
- H04L 12/413 (2006.01)

(52) U.S. Cl. ............ 455/518; 455/418; 455/463; 455/512; 455/519; 370/329; 370/347; 370/352; 370/447

(58) Field of Classification Search ............ 455/90.2, 455/79, 67.14, 573, 572, 567, 561, 522, 518, 455/519, 520, 521, 517, 515, 512, 509, 458, 455/455, 456.1, 452.1, 452.2, 426.1, 69, 455/527, 463, 77, 78, 116, 186, 255, 403, 455/405, 412.1, 457, 466, 511, 516, 566, 455/574, 575.1, 418, 422.1, 426.2, 435.1, 455/439, 445, 450, 446, 452, 456, 550.1; 370/260, 312, 328, 347, 350, 352, 432, 401, 370/462, 230, 248, 389, 418, 254, 255, 266, 370/277, 320, 321, 322, 329, 336, 337, 338, 370/341, 342, 343, 344, 346, 348, 441, 442, 370/444, 447, 449, 455, 461, 465, 466, 468, 370/474, 475, 476, 477
See application file for complete search history.

(56) References Cited

U.S. PATENT DOCUMENTS

| 5,134,714 | A | 7/1992 | Janzen et al. |
| 6,295,284 | B1* | 9/2001 | Maggenti ............ 370/328 |
| 6,327,254 | B1* | 12/2001 | Chuah ............ 370/328 |
| 6,411,815 | B1* | 6/2002 | Balasuriya ............ 455/512 |

(Continued)

FOREIGN PATENT DOCUMENTS

| EP | 0 778 680 | 11/1996 |
| JP | 10-333806 | 12/1998 |
| JP | 2003-337641 | 11/2003 |
| WO | WO 95/05721 | 2/1995 |
| WO | WO03036801 | 5/2003 |

OTHER PUBLICATIONS

"Push-to-Talk Over Cellular (PoC) User Plane; Transport Protocols; PoC Release 1.0;" Transport Protocols VI.1.0, Aug. 2003, page Complete, XP000863836.

*Primary Examiner*—Nay A Maung
*Assistant Examiner*—Paul P Tran
(74) *Attorney, Agent, or Firm*—Lee, Hong, Degerman, Kang & Waimey

(57) ABSTRACT

A server servicing a plurality of mobile communication systems for half-duplex communication is provided. The server comprises a transceiver to send and receive communication signals; a processor in operational relationship with the transceiver for processing executable code stored in a storage medium accessible by the processor, the executable code configured to cause the processor to detect a time duration in which a user continuously activates a half-duplex function.

20 Claims, 3 Drawing Sheets

U.S. PATENT DOCUMENTS

| | | | |
|---|---|---|---|
| 6,928,294 B2 * | 8/2005 | Maggenti et al. | 455/518 |
| 7,069,032 B1 * | 6/2006 | El-Fishawy | 455/517 |
| 7,079,857 B2 * | 7/2006 | Maggenti et al. | 370/447 |
| 7,082,315 B2 * | 7/2006 | Bar-On | 455/518 |
| 7,266,382 B2 * | 9/2007 | Noel et al. | 455/518 |
| 7,639,634 B2 * | 12/2009 | Shaffer et al. | 370/266 |
| 2002/0172169 A1 | 11/2002 | Rosen et al. | |
| 2003/0012149 A1 | 1/2003 | Maggenti et al. | |
| 2003/0078064 A1 | 4/2003 | Chan | |
| 2003/0153339 A1 * | 8/2003 | Crockett et al. | 455/518 |
| 2003/0235184 A1 * | 12/2003 | Dorenbosch et al. | 370/352 |
| 2004/0077358 A1 | 4/2004 | Bennett et al. | |

* cited by examiner

TALK BURST ALLOCATION IN A PTT COMMUNICATION NETWORK

CROSS REFERENCE TO RELATED APPLICATIONS

Pursuant to 35 U.S.C. § 119(a), this application claims the benefit of earlier filing date and right of priority to Korean Patent Application No. 2004-115566, filed on Dec. 29, 2004, the content of which is hereby incorporated by reference herein in its entirety.

Pursuant to 35 U.S.C. § 119(e)(1), this application claims the benefit of earlier filing date and right of Provisional Application No. 60/591,602 filed on Jul. 28, 2004, the content of which is hereby incorporated by reference herein in its entirety.

FIELD OF THE INVENTION

The present invention relates to a Push-To-Talk (PTT) service, and particularly to a talk burst allocation method in a communication network supporting a group of PT communication terminals.

BACKGROUND OF THE INVENTION

PTT is a service for supporting instantaneous communications between two users in a one-to-one or one-to-group (one-to-many) manner. In general, when a user presses a PTT key of a PTT terminal (e.g., a walkie-talkie unit) the other users tuned on the same frequency or channel can hear the user.

A PTT communication network typically includes a PTT terminal that supports a PTT service and a PTT server for controlling the communication of voice and data in the PTT network. The PTT server also controls the "right to talk" (or right to speak) procedures for each PTT terminal. A user that has been granted the right to talk is said to have been granted the "floor" or a "talk burst".

A right to talk procedure refers to allocating qualifications for transmitting data in half-duplex communications, such as a PTT service, and is used for preventing collision conditions when more than two users attempt to communicate or transmit data simultaneously. Talk burst requests (or floor requests) from various users are granted or denied by the PTT server such that only one user (PTT terminal) at a time has the right to talk while other users must listen.

In the related art PTT service system, when a user wishes to obtain a right to talk, the user presses a key (e.g., PTT key) of the PTT terminal. If the right to talk has not been allocated to another PTT terminal, the PTT server transmits a talk burst grant message (i.e., floor grant message) to the requesting PTT terminal. However, if another PTT terminal already has received the right to talk, the PTT server transmits a talk burst deny message (i.e., floor deny message) to the corresponding PTT terminal of that user.

The PTT terminal that receives the talk burst grant message from the PTT server is allowed to transmit voice and data to one or more other PTT terminals via the PTT server. The other PTT terminal that receives the talk burst deny message from the PTT server outputs an error message in order to notify the user that the talk burst has been denied. The user then confirms the error message and again requests a right to talk by pressing the key of the PTT terminal waiting until the right to talk of another user is released.

In the related art talk burst allocation method in the PTT service system, a first user who wishes to obtain the right to talk may request a talk burst by pressing the key of the PTT terminal. If a second user has received the right to talk in advance of the first user, the first user must wait until the second user releases his right to talk. Only after the second user has released the line can the first user request a right to talk.

Accordingly, in the related art talk burst allocation method, when a user requests a right to talk, the user may not obtain such right to talk because another user already has the right to talk. In addition, if the user does not press the PTT key soon after deallocation of right to talk to another (i.e., after another user releases his right to talk), the user may lose his chance to other users who may press the PTT key on their PTT terminal more quickly than the first user.

Furthermore, in the related art talk burst allocation method when the user has data high priority, the user may not be able to transmit in advance of others because the right to talk is allocated regardless of the type or priority of data.

Thus, systems and methods are needed to overcome the noted problem.

SUMMARY

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a talk burst allocation method in a push-to-talk (PTT) communication system is provided.

The method comprises assigning a priority ranking to at least one PTT terminal among a plurality of PTT terminals in a PTT communication system; and allocating a talk burst to the PTT terminal with the highest priority ranking. The allocating step is performed by a PTT server servicing the plurality of PTT terminals.

A priority ranking is determined for a first PTT terminal among the plurality of PTT terminals based on length of time a PTT request actuator on the PTT terminal is pressed. The determining step is performed by a PTT server servicing the plurality of PTT terminals or the first PTT terminal depending on implementation.

In accordance with another aspect of the invention, a talk burst allocation method in a push-to-talk (PTT) communication system supporting a plurality of PTT terminals is provided. The method comprises determining whether a talk burst can be allocated to a first PTT terminal having a first priority, in response to receiving a talk burst request message from the first PTT terminal; and changing priority of the first PTT terminal to a second priority, when the PTT terminal's request for a talk burst is denied.

In one embodiment, the second priority has a higher ranking than the first priority. Priority of the first PTT terminal may be updated according to a state defined by length of user interaction with a PTT actuator of the first PTT terminal. The PTT terminal re-transmits the talk burst request message to the PTT server, after passage of a threshold time period.

Preferably, the talk burst to the PTT terminal is allocated in accordance with the first priority. Priority of the first PTT terminal may be updated according to a state defined by length of time a user has pressed a PTT key on the first PTT terminal, for example. Priority of the first PTT terminal is monitored based on when the PTT key is released, such that the first PTT terminal transmits a talk burst request delete message to the PTT server, when the PTT key is released. Priority of the first PTT terminal is changed to a default value, in response to receiving a talk burst request delete message from the first PTT terminal.

In accordance with another embodiment, a talk burst allocation method in a push-to-talk (PTT) communication system is provided. The method comprises receiving a request for a talk burst from a plurality of PTT terminals, each terminal having a corresponding priority level; and allocating the talk burst to a first PTT terminal having a first priority level, when the talk bust is unallocated.

The method further comprises corresponding priority levels of all other PTT terminals to which talk bust is not allocated. The first priority level, in one embodiment, is the highest priority level among all corresponding priority levels.

In another embodiment, a talk burst allocation method in a push-to-talk (PTT) communication system is provided. The method comprises accepting a priority ranking among a plurality of PTT terminals in a PTT communication system; and obtaining a talk burst from a PTT server, when the assigned priority ranking is the highest ranking among the plurality of PTT terminals. A priority ranking is assigned to a first PTT terminal among the plurality of PTT terminals based on a time when a talk burst request was submitted by the first PTT terminal.

In yet another embodiment, a method of servicing a plurality of users in a voice/data communication system comprises detecting a time duration when a user continuously activates a half-duplex function of a communication terminal in the voice/data communication system; assigning a priority to said user according to the detected time duration; and granting a transmission privilege to said user according to the assigned priority. Depending on implementation, the half-duplex function may be a push-to-talk function or any functional equivalent thereof.

The assigned priority's magnitude preferably has a direct relationship with the detected time duration's magnitude. The transmission privilege provides the user with a right to talk to other users in the voice/data communication system. The transmission privilege is granted upon receiving at least one transmission request sent to a server in the voice/data communication system, during the detected time duration.

In certain embodiments, the transmission request comprises at least one of a right to talk request, floor request, and talk burst request and is retransmitted to the server in a periodic manner.

A server servicing a plurality of mobile communication systems for half-duplex communication is provided. The server comprises a transceiver to send and receive communication signals; a processor in operational relationship with the transceiver for processing executable code stored in a storage medium accessible by the processor, the executable code configured to cause the processor to detect a time duration during which a user continuously activates a half-duplex function, assign a priority to said user according to the detected time duration, and grant a transmission privilege to said user according to the assigned priority.

The half-duplex function is a push-to-talk function, wherein the assigned priority's magnitude has a direct relationship with the detected time duration's magnitude and the transmission privilege provides the user with a right to talk.

These and other embodiments of the present invention will also become readily apparent to those skilled in the art from the following detailed description of the embodiments having reference to the attached figures, the invention not being limited to any particular embodiments disclosed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

Features, elements, and aspects of the invention that are referenced by the same numerals in different figures represent the same, equivalent, or similar features, elements, or aspects in accordance with one or more embodiments of the system.

DETAILED DESCRIPTION OF THE PREFERRED EMBODIMENTS

Figure 1:
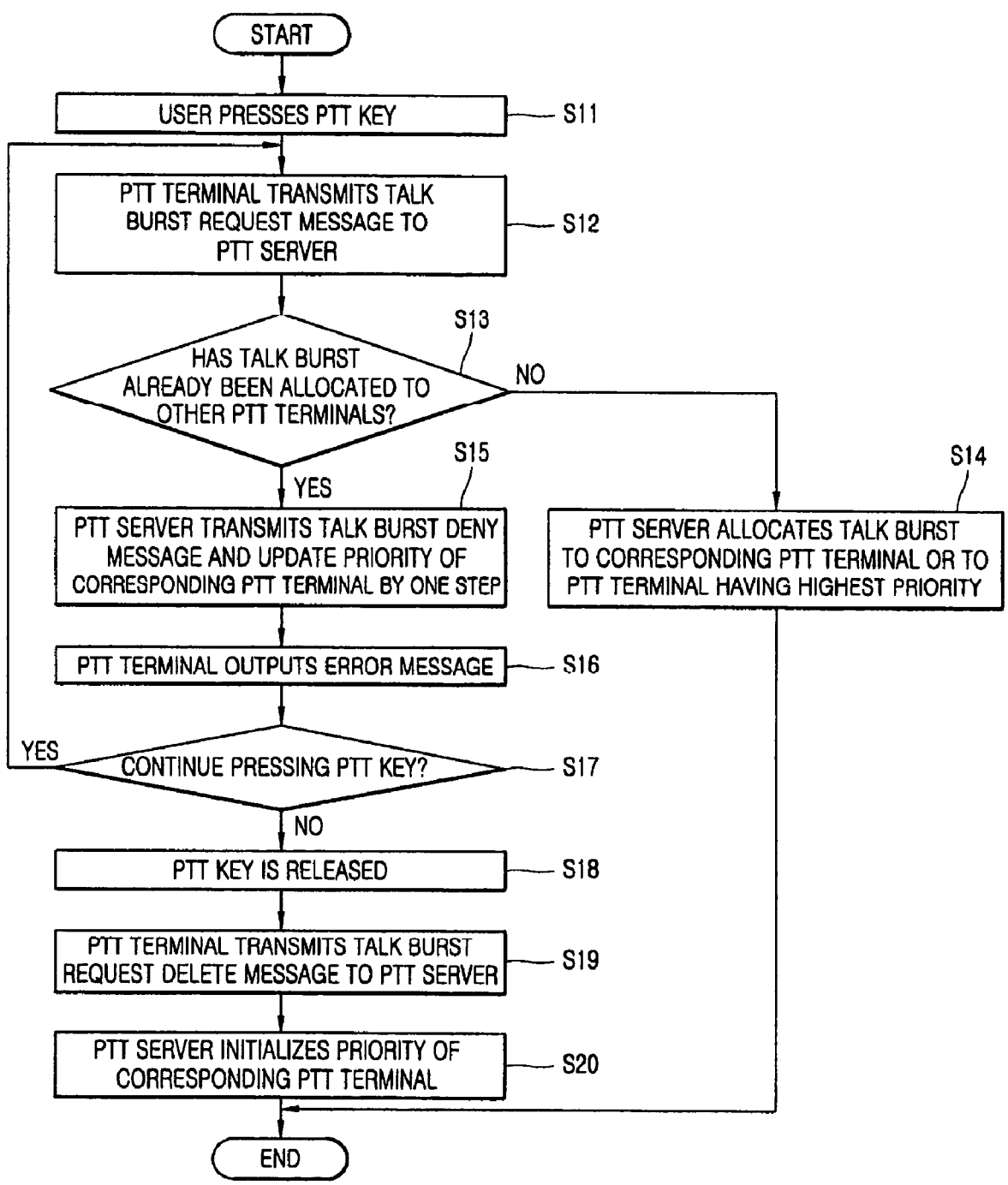
FIG. 1 is a flow chart showing a preferred method for talk burst allocation according to one embodiment of the present invention.

Push-To-Talk, commonly abbreviated as PTT, is a method of communicating on half-duplex communication lines. Pushing a button allows voice communication to be transmitted, and releasing the button allows voice communication to be received. Such PTT features are implemented in mobile terminals (e.g., mobile phones, handsets, wireless devices, etc.), in one embodiment, allowing a mobile terminal to function as a digital two-way radio (e.g., a walkie-talkie) in a push-to-talk operation.

In one embodiment, one person at a time can talk by pressing a PTT button and one or several others can listen. One or more PTT communication schemes based on 2.5 G packet-switched networks (e.g., CDMA, GPRS, etc.) may be used depending on implementation. In an exemplary embodiment, SIP (Session Initiation Protocol) and RTP (Real Time Transport Protocol) are utilized. These versions of PTT are called "Push-To-Talk over Cellular" (or Push-over-Cellular) and are commonly abbreviated as PoC.

As cellular communication networks continue to evolve and accommodate the transfer of various types of data (e.g., voice, images, audio, video, multimedia, etc.), various Internet access technologies are being employed. An example is the Internet Protocol (IP), which is a data-oriented protocol used by source and destination hosts for communicating data across a packet-switched network (e.g., the Internet). Examples include IPv4, IPv6, and the like.

Among the numerous features of PTT, the floor control procedures related to a server (e.g., a PTT server) and a client (e.g., a PTT client) are provided. Preferably, the server is a centralized point that grants a "floor" to a PTT user who wishes to speak to a talk group. A user can "take the floor" and speak to other users who can only listen during that time. The client includes various mechanisms to facilitate the priority allocation required in granting the floor to the user.

When multiple users wish to take the floor (in order to talk with other users) by respectively sending a transmission request (e.g., a floor request, a talk burst request, etc.), priorities are allocated such that the users take turns in speaking by considering whether their transmission requests were granted or denied. For example, a set of priorities may be allocated on a first come first served basis to each user. The server may either grant or deny a floor request based upon the communications environment or other factors as provided below.

In one embodiment, talk burst allocation provides the right to talk (or right to speak) and permission to transmit (access request). A user that is granted the right to talk is said to have been granted the "floor" or granted a "talk burst".

In a talk burst allocation method according to one embodiment of the present invention, when a certain user requests a right to talk while another user already has the right to talk, the user's talk burst request is not granted. In one embodiment, the priority of a corresponding PTT terminal is increased (i.e., upgraded) on the basis of the length of time the user presses the PTT key. The PTT terminal having the highest priority is given to right to talk. If the user releases the PTT key of the PTT terminal for which a talk burst request has been denied, the priority of the corresponding PTT terminal is initialized, for example, to a value of '0'.

In some embodiments, priority rankings are established by other measures than the length of time the PTT key is pressed. In other embodiments, for example, the number of times the PTT key is pressed, or the wait time from the time the PTT key was pressed to the time the floor is available are used as a measure.

In a preferred embodiment, if the talk burst request is denied such that the PTT terminal does not obtain the right to talk, the priority can be increased by the PTT server or by the corresponding PTT terminal.

The PTT service system according to the present invention may comprise a PTT terminal having a PTT key and a PTT server for confirming a priority for a talk burst request of the PTT terminal and allocating a right to talk for the PTT terminal having the highest priority. The priority can be counted by the PTT server or by the PTT terminal.

FIG. 1 is a flow chart of a first embodiment of a talk burst allocation method in a PTT service system according to the present invention, in which a talk burst allocation method by which the PTT server counts the priorities is explained. It can be understood that such counting procedure may be achieved through use of a timer or counter mechanism, for example.

When a user presses the PTT key (S11), the PTT terminal recognizes the PTT key pressed state and transmits a talk burst request message to the PTT server (S12). A PTT server having received the talk burst request message confirms whether the talk burst has already been allocated to another user (S13). If the talk burst has not been allocated to any other user, the PTT server transmits a talk burst grant (floor grant) message to the corresponding PTT terminal of that user to thus allocate the talk burst to that PTT terminal (S14).

If it is confirmed that the talk burst has already been allocated to another user, the PTT server transmits a talk burst deny message to the corresponding PTT terminal to notify that the talk burst can not be allocated, and the PTT server increases a priority level for the talk burst of the PTT terminal (S15). The priority level can be sequentially incremented to a higher priority level for example.

In alternative embodiments, priority levels may be increased by multiple levels, depending on implementation. For example, if the user continuously keeps the PTT key depressed, the current priority level may be increased in single step increments during the first 3 seconds, and thereafter, the priority level may be increased by two or more step increments in order to increase the probability for that user to obtain a right to talk.

The PTT terminal having received the talk burst deny message notifies the user that the talk burst has been denied (S16). This notification can be achieved through audio, visual or tactile means or a combination thereof, to outputting an error message. The user confirms the error message and determines whether to maintain or release the talk burst request state (S17). For example, the user can either cancel his request for right to talk by releasing the PTT button, or can maintain it by continuing to hold the PTT button.

When the user continuously holds the PTT key in a pressed state in order to maintain the talk burst request, the PTT terminal re-transmits the talk burst request message to the PTT server after a certain time passes (S12). Thus, while the PTT button remains pressed, the PTT terminal periodically re-transmits a talk burst request message.

The time period of such re-transmitting can be varied accordingly, by for example, the PTT terminal itself or upon receiving instructions from the PTT server. The re-transmitting time period may be relatively short (e.g., 1 second) or relatively long (e.g., 3 seconds). A shorter period may be advantageous because it would allow the user to quickly obtain his right to talk.

However, the frequent re-transmitting of talk burst requests may result in undesirably high consumption of radio resources and battery power. A longer period may be advantageous by minimizing the use of radio resources and conserving battery power, but the user may experience delays in obtaining his right to talk.

In one embodiment, a combination of short and long time periods may also be used during a single talk burst request duration (i.e., while the user continues to press the PTT key). For example, during the first 5 seconds while the user continues to hold down the PTT button, a talk burst message may be re-transmitted every 0.5 seconds (e.g., ten re-transmissions made during 5 seconds).

Preferably, if the user continues to hold down the PTT button after those first 5 seconds, then a talk burst message may be re-transmitted every 2 seconds, for example. Thus, re-transmissions may be performed relatively frequently at first, and less frequently as time passes or vice versa. Accordingly, the re-transmissions can be varied as needed.

If another user has the talk burst, the PTT server increases the priority of the corresponding PTT terminal (S13 and S15). That is, while the user continues to press the PTT key, the PTT terminal periodically transmits the talk burst request message to the PTT server, and whenever the talk burst request is denied, the PTT server increases the priority of the corresponding PTT terminal.

When the user having confirmed the talk burst deny message releases the PTT key pressed state to release the talk burst request (S18), the PTT terminal transmits a talk burst request delete message to the PTT server (S19), and the PTT server initializes the priority of the corresponding PTT terminal to '0' for example (S20). Thus, the PTT terminal is initialized to have a zero priority level in one embodiment.

Figure 2:
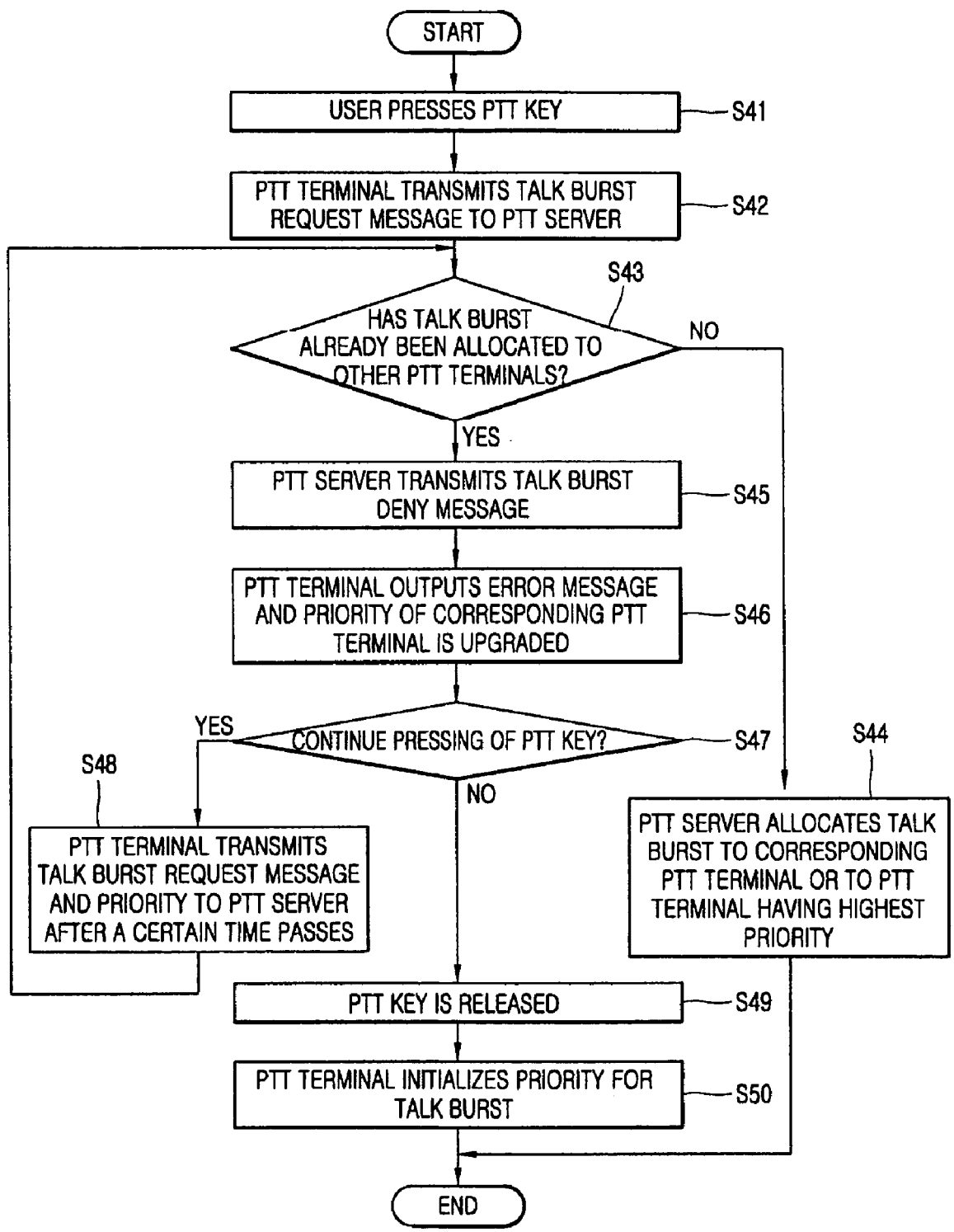
FIG. 2 is a flow chart showing another preferred embodiment of the talk burst allocation method according to the present invention.

Referring to FIG. 2, in one embodiment, the PTT terminal counts its priority for the talk burst. So, when the user requests a talk burst by pressing the PTT key (S41), the PTT terminal transmits a talk burst request message to the PTT server (S42).

The PTT server having received the talk burst request message confirms whether the talk burst has been allocated to another PTT terminal (S43), and if the talk burst has not been already allocated, the PTT server transmits a talk burst grant message to the corresponding PTT terminal, preferably having the highest priority (S44). If the talk burst is already granted, the PTT server transmits a talk burst deny message to the corresponding PTT terminal (S45).

The PTT terminal having received the talk burst deny message outputs an error message to notify the user that the talk burst has been denied, and increases the priority for the talk burst (S46). The user having confirmed the error message determines whether to maintain or release the talk burst requested state (S47) so as to maintain or release the PTT key pressed state.

When the user keeps on pressing the PTT key in order to maintain the talk burst request state, the PTT terminal transmits to the PTT server the talk burst request message together with the priority of the corresponding PTT terminal after a certain time passes (S49).

If the talk burst has been allocated to another PTT terminal, the PTT server having received the priority of the PTT terminal and the talk burst request message transmits the talk burst deny message to the corresponding PTT terminal (S43 and S45). The PTT terminal having received the talk burst deny message outputs the error message and simultaneously increases its priority for the talk burst (S46). However, if the talk burst has not been allocated to the PTT terminal, the PTT server allocates the talk burst to the PTT terminal (S44).

In one embodiment, if the user continues to press the PTT key (S47) in response to an error message (S46), the PTT terminal periodically transmits the talk burst request message and the priority to the PTT server (S48). Whenever the talk burst request is denied by the PTT server (S45), the PTT terminal increases its priority for the talk burst (S46).

If the user having confirmed the talk burst deny message releases the PTT key pressed state in order to release the talk burst request (S49), the priority stored in the PTT terminal itself is initialized to '0', for example, and a talk burst request message is not transmitted any more (S50).

In the PTT service system according to one embodiment of the present invention, the PTT server allocates the talk burst to the PTT terminal having the highest priority. Thus, a user having urgent data to be transmitted can maintain the PTT key in a pressed state to increase his priority for obtaining a talk burst.

As described, in the talk burst allocation method in the PTT system according to the present invention, the priority for the talk burst of the PTT terminal is increased in a manner relative to the time during which the user presses the PTT key. The talk burst is allocated according to the priority so that the user can quickly obtain a talk burst even if the talk burst has already been allocated to another user.

Therefore, the present invention provides a talk burst allocation method in a PTT service system for providing a priority according to the time a user presses a PTT key and allocating a talk burst according to the priority.

To achieve these and other advantages and in accordance with the purpose of the present invention, as embodied and broadly described herein, there is provided a talk burst allocation method in a PTT service system comprising one or more PTT terminals and a PTT server for controlling a talk burst of each PTT terminal, by which the PTT server allocates the talk burst to the PTT terminal having a high priority with respect to the talk burst.

According to another embodiment of the invention, a talk burst allocation method in a PTT service system comprises judging whether the talk burst is to be allocated to the corresponding PTT terminal, if a PTT server receives a talk burst request message from a specific PTT terminal. When it is judged that the talk burst is not to be allocated to the corresponding PTT terminal, a priority for the talk burst of the PTT terminal is updated.

Then a talk burst deny message from the PTT server to the PTT terminal is transmitted. A PTT key state by the PTT terminal is monitored having received the talk burst deny message. If the PTT key is continuously pressed for a certain time, the talk burst request message from the PTT terminal to the PTT server is retransmitted.

According to another embodiment of the present invention, a talk burst allocation method in a PTT service system comprises judging whether a talk burst has already been allocated to another PTT terminal, if a PTT server receives a talk burst request message from one or more PTT terminals. If it is judged that the talk burst has not been allocated, the PTT terminals' priorities are confirmed. The talk burst is allocated to the PTT terminal having the highest priority and priorities of the remaining PTT terminals are updated. If the PTT server receives a talk burst request delete message from a specific PTT terminal, the priority of the corresponding PTT terminal is initialized.

The present invention can be embodied as software, hardware, or a combination of both. For example, talk burst allocation method according to the present invention can be embodied as codes or commands in a software program that can be stored in a storage media (such as, internal memory of the user terminal, flash memory, etc.) and that can be executed by a processor (such as a microprocessor within the user terminal).

The present invention provides a method of handling multiple users in a group communication system. The method may comprise detecting a time duration during which a user continuously activates a half-duplex function; assigning a priority to said user according to the detected time duration; and granting a transmission privilege to said user according to the assigned priority.

The half-duplex function can be a push-to-talk function. The assigned priority can be increased as the detected time duration increases. Also, the transmission privilege can provide the user with a right to talk to other users. The transmission privilege can be granted upon receiving one or more transmission requests that are sent to a server during the detected time duration. The transmission requests can be right to talk requests, floor requests, or talk burst requests and transmission requests can be re-sent to the server in a periodic manner.

Figure 3:
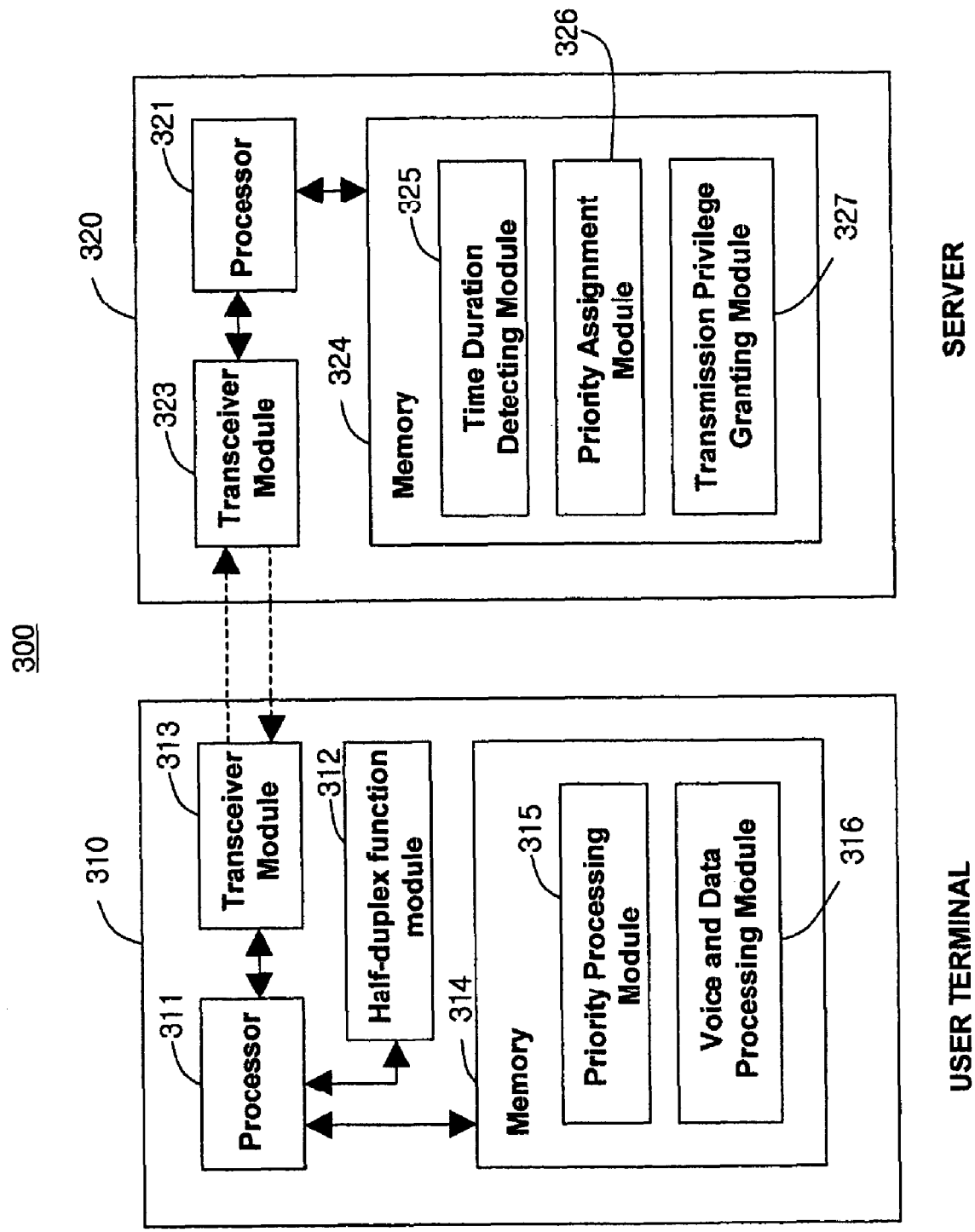
FIG. 3 depicts a communication system comprising a server and a user terminal according to the present invention.

Referring to FIG. 3, the present invention provides a server 320 of a group communication system 300 supporting half-duplex communications. The server 320 comprises a transceiver 323 to send and receive communication signals. A processor 321 in operational relationship with the transceiver and a storage medium 324 for storing executable code modules are also provided.

In one embodiment, modules 325, 326, 327 are provided for respectively detecting a time duration in which a user continuously activates a half-duplex function, assigning a priority to said user according to the detected time duration, and granting a transmission privilege to said user according to the assigned priority.

In a preferred embodiment, the present invention provides a user terminal 310 of a group communication system 300 supporting half-duplex communications. The user terminal 310 may comprise a transceiver 313 to send and receive communication signals; a half-duplex function module 312 that is activated to allow voice and data to be transmitted and de-activated to allow voice and data to be received; a processor 311 cooperating with the transceiver and the half-duplex function module.

A storage medium 314 containing executable modules 315 and 316 for respectively activating a half-duplex function upon selection by the user may be included for sending one or more requests to a server to obtain a right to talk, based upon a time duration detected by the server during which the user continuously activates the half-duplex function and based upon a priority assigned by the server according to the detected time duration, and transmitting data to the other users upon being granted a transmission privilege by the server.

The features of the present invention are applicable to group (point-to-multipoint) communications, such as half-duplex communications like PTT and PoC, (i.e., a type of PTT) that allow voice and data communication to be transmitted upon activating a feature (e.g., by pushing a button, upon selecting a soft key, etc.) and allow voice and data communication to be received upon de-activating the feature (e.g., releasing the button, de-selecting the soft key, etc.).

Additionally, the teachings and suggestions of the present invention can also be applicable and are intended to be applied to the "Push-To-x" (PTx) technology. PTx is an enhancement of PTT and PoC technologies and refers to an enhanced version of PTT capable of supporting voice communications and various types of multimedia applications (e.g., photos, ring tones, games, content, SMS, MMS, etc.).

An example of PTx is "Push-To View" (PTV) technology that can allow users to engage in multi-user video conferencing. The "push-to" interface technology is used in one embodiment for connecting multiple users. The user's contact list (e.g. "buddy list") is the center and starting point for the user's communication interface. By selecting a "push-to-x" function, the user will be able to launch various types of applications and communication sessions, including PTT, video conferencing, sending photos, and voice sessions, for example.

Each user's state of presence ("presence") is a component for the user to interface with a contact list. For example, when the user activates the PTx function, a contact list containing various persons ("buddies") may be displayed with a list of options for each contact person based on their state of presence, capabilities of their mobile terminal or device, interoperability of their network, and the like. The user may interface with his mobile terminal or wireless device through audio, visual, or tactile alerts or notifications.

Regarding the terminology used herein, it should be noted that PTT is also referred to as "P2T" and PTx is also referred to as "P2x" and PTV is also referred to as "P2V". Other similar abbreviations or acronyms may also be used to refer to the same basic concepts regarding various "push-to" techniques under development.

As the present invention may involve communications through Internet access (e.g., VoIP), the features of the present invention are also intended to be applicable to enhanced Internet access services, such as the "Broadband convergence Network (BcN)," which is expected to provide Internet access service with speeds of 50~100 Mbps, roughly 50 times faster than conventional broadband services, for example.

The embodiments described above are to be considered in all aspects as illustrative only and not restrictive in any manner. Thus, other exemplary embodiments, system architectures, platforms, and implementations that can support various aspects of the invention may be utilized without departing from the essential characteristics described herein. These and various other adaptations and combinations of features of the embodiments disclosed are within the scope of the invention. The invention is defined by the claims and their full scope of equivalents.

What is claimed is:

1. A method for allocating a talk burst in a push-to-talk (PTT) communication system, the method comprising:
receiving a first talk burst request from a first PTT terminal from among a plurality of PTT terminals in the PTT communication system;
receiving a second talk burst request from a second PTT terminal from among the plurality of PTT terminals in the PTT communication system;
granting the first talk burst request, in response to determining that the talk burst is unallocated and a first priority level associated with the first PTT terminal is higher than a second priority level associated with the second PTT terminal; and
denying the first talk burst request, in response to determining that the talk burst is allocated or the first priority level is less than the second priority level,
wherein the first talk burst request is periodically retransmitted by the first PTT terminal, while a PTT request actuator on the first PTT terminal is continuously activated and the first talk burst request is denied.

2. The method of claim 1, wherein the receiving, granting, and denying of the first talk burst request are performed by a PTT server.

3. The method of claim 1, further comprising determining the first priority level based on length of time the PTT request actuator on the first PTT terminal is continuously activated.

4. The method of claim 1, further comprising changing the first priority level, in response to denying the first talk burst request.

5. The method of claim 1, further comprising resetting the first priority level to an initial value, in response to the PTT request actuator on the first PTT terminal being released.

6. The method of claim 1, further comprising determining the first priority level on a first-come, first served basis.

7. The method of claim 1, further comprising determining the first priority level based on number of times the PTT actuator on the first PTT terminal is activated.

8. The method of claim 1, wherein the first talk burst request is denied through at least one of an audio, a visual, or tactile means.

9. The method of claim 1, wherein the first talk burst request is periodically retransmitted by the first PTT terminal based on a combination of different time periods, while the PTT request actuator on the first PTT terminal is continuously activated and the first talk burst request is denied.

10. The method of claim 1, wherein the first talk burst request is periodically retransmitted by the first PTT terminal relatively frequently at first and less frequently as time passes, while the PTT request actuator on the first PTT terminal is continuously activated and the first talk burst request is denied.

11. A system for allocating a talk burst in a push-to-talk (PTT) communication system, the system comprising:
means for receiving a first talk burst request from among a first PTT terminal from a plurality of PTT terminals in the PTT communication system;
means for receiving a second talk burst request from a second PTT terminal from among the plurality of PTT terminals in the PTT communication system;
means for granting the first talk burst request, in response to determining that the talk burst is unallocated and a first priority level associated with the first PTT terminal is higher than a second priority level associated with the second PTT terminal; and
means for denying the first talk burst request, in response to determining that the talk burst is allocated or the first priority level is less than the second priority level,
wherein the first talk burst request is periodically retransmitted by the first PTT terminal, while a PTT request actuator on the first PTT terminal is continuously activated and the first talk burst is denied.

12. The system of claim 11, wherein a PTT server comprises the means for the receiving, granting, and denying the first talk burst request.

13. The system of claim 11, further comprising means for determining the first priority level based on length of time the PTT request actuator on the first PTT terminal is continuously activated.

14. The system of claim 11, farther comprising means for changing the first priority level, in response to denying the first talk burst request.

15. The system of claim 11, further comprising means for resetting the first priority level to an initial value, in response to the PTT request actuator on the first PTT terminal being released.

16. The system of claim 11, further comprising means for determining the first priority level on a first-come, first served basis.

17. The system of claim 11, further comprising means for determining the first priority level based on number of times the PTT actuator on the first PTT terminal is activated.

18. The system of claim 11, wherein the first talk burst request is denied through at least one of an audio, a visual, or tactile means.

19. The system of claim 11, wherein the first talk burst request is periodically retransmitted by the first PTT terminal based on a combination of different time periods, while the PTT request actuator on the first PTT terminal is continuously activated and the first talk burst request is denied.

20. The system of claim 11, wherein the first talk burst request is periodically retransmitted by the first PTT terminal relatively frequently at first and less frequently as time passes, while the PTT request actuator on the first PTT terminal is continuously activated and the first talk burst request is denied.

* * * * *